United States Patent [19]
Miyake et al.

[11] 3,802,399
[45] Apr. 9, 1974

[54] AIR INLET ARRANGEMENT IN FOUR-CYCLE ENGINE

[75] Inventors: Mikihiko Miyake; Eimatsu Hosijima, both of Okayama, Japan

[73] Assignees: Mitsui Shipbuilding and Engineering Co. Ltd.; Japan Ship's Machinery Development Association, both of Tokyo, Japan

[22] Filed: Apr. 25, 1972

[21] Appl. No.: 247,372

[30] Foreign Application Priority Data
May 19, 1971 Japan................................ 46-40258

[52] U.S. Cl. .... 123/52 M, 123/52 MV, 123/52 MC, 123/75 B
[51] Int. Cl............................................ F02b 75/18
[58] Field of Search.......... 123/52 M, 52 MV, 75 B, 123/41.67

[56] References Cited
UNITED STATES PATENTS

| | | | |
|---|---|---|---|
| 1,416,977 | 5/1922 | Roof................................ | 123/52 M |
| 640,674 | 1/1900 | Lewis............................... | 123/41.67 |
| 1,467,497 | 9/1923 | Philip.............................. | 123/41.67 |

FOREIGN PATENTS OR APPLICATIONS

| | | | |
|---|---|---|---|
| 466,789 | 3/1914 | France ............................. | 123/52 M |
| 518,518 | 2/1940 | Great Britain ................... | 123/52 M |

Primary Examiner—Laurence M. Goodridge
Attorney, Agent, or Firm—Howson and Howson; Henry H. Skillman

[57] ABSTRACT

Air inlet arrangement in four-cycle engine having two inlet valves and two exhaust valves of which ports of each valve unit are parallelly connected to the air duct, comprising inlet duct provided on the same side as exhaust duct, an inlet air chamber provided around each cylinder, and manifold to communicate the inlet air chamber with each inlet port whereby the manifold does not constitute an obstacle to access to devices provided in the engine.

2 Claims, 5 Drawing Figures

AIR INLET ARRANGEMENT IN FOUR-CYCLE ENGINE

This invention relates to an air inlet arrangement in four-cycle engine of which each cylinder has two inlet valves and two exhaust valves.

In order to decrease the inlet and exhaust valves resistances in such a type of engine, it is desirable that the two inlet and exhaust ports are parallelly connected to the inlet and exhaust pipes respectively. In order to permit such connections, the inlet pipe and exhaust pipe are arranged on both sides of the cylinders. The arrangement, however, increases the width of the engine, and access to the cam shaft and fuel pump generally provided near the inlet ports is difficult, because the inlet pipe is in the way.

The present invention is intended to overcome the drawbacks inherent in the afore mentioned type of engine.

The air inlet arrangement according to the present invention is characterized in that air inlet duct is provided behine the cylinder, each cylinder is provided with an air chamber communicated with the air inlet duct, the air chamber is communicated to the inlet ports by a manifold so as not to constitute an obstacle to access to devices provided in the engine.

Figure 1:
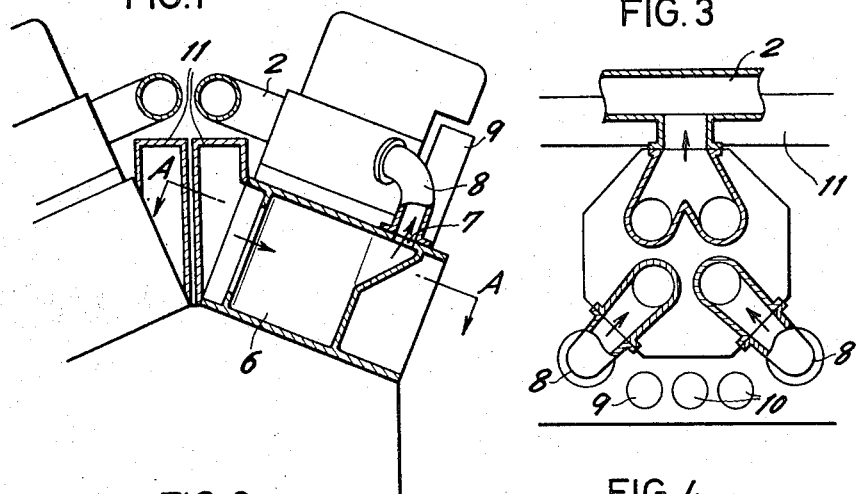
FIG. 1 is a front view, partly in section, showing an embodiment of the present invention.
Figure 3:
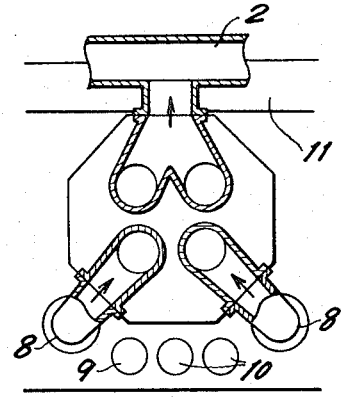
FIG. 3 is a plan view of FIG. 1.
Figure 2:
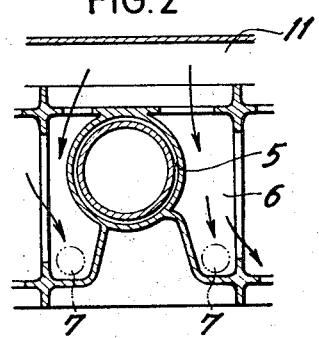
FIG. 2 is a sectional view taken on line A—A in FIG. 1.

Referring now to FIGS. 1 to 3, which illustrate an embodiment of the present invention applied to a V-type engine, numeral 2 designates exhaust pipes and numeral 11 designates inlet ducts. The inlet ducts extends behind the engine along the row of cylinders. Air flowing in each inlet duct 11 is introduced into a large capacity inlet air chamber 6 provided around the cooling jacket 5 of each cylinder. Air is sucked into the cylinder from each air chamber 6 through two outlet ports 7 provided for each cylinder on the cam shaft side and manifolds 8.

With the above construction, the inlet duct does not outwardly protrude. Also, the inlet air outlet ports 7 may be provided at positions except the front of the cylinder and spaced from the fuel pump 9 and valve actuating means 10. Thus, it is possible to obtain a construction in which the manifolds 8 will not increase the width of the engine.

Figure 4:
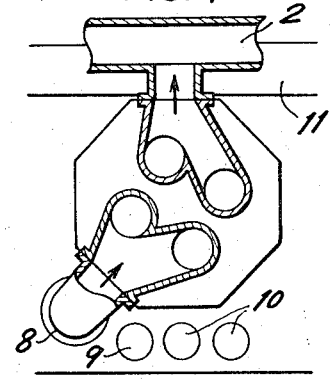
FIG. 4 is a plan view showing another embodiment of the present invention.

FIG. 4 shows a different construction in which cylinder is provided with a single manifold 8.

Figure 5:
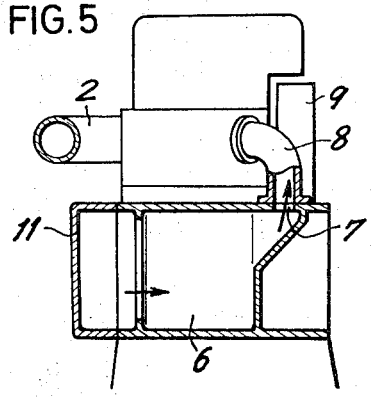
FIG. 5 is a view, partly in section, showing further another embodiment of the present invention.

FIG. 5 shows an air inlet arrangement applied to a straight type engine. The same parts as those in preceding examples are designated by same reference numerals as those used in the examples.

From the foregoing, it will be observed that the present invention provides an air inlet arrangement without the necessity of providing inlet pipe or duct on front of the engine. Thus, it is possible to provide an engine construction capable of permitting ready access to the fuel pump and valve actuating mechanism as well as holding the engine width to a minimum. Also, inlet air chamber of sufficiently large capacity decreases pressure pulsation in the inlet duct which would present various problems in respect of the inlet characteristic.

What is claimed is:

1. In a 4-cycle engine having a fuel pump, a series of cylinders disposed in a row, each cylinder having two inlet valves and two exhaust valves, and valve actuating mechanism, the improvement including an air inlet duct and an exhaust duct extending along one side of said row of cylinders, an inlet air chamber surrounding each cylinder in said series and being open to said inlet duct at the one side of said row and manifold means connected to said inlet air chamber on the opposite side of said row and extending to said inlet valves for admitting air into said cylinders, said engine fuel pump and valve actuating mechanism being mounted on said opposite side of said row of cylinders, whereby said inlet and exhaust ducts are remote from said fuel pump and valve actuating mechanism, said cylinder including a cooling jacket circumscribing said cylinder within said inlet air chamber.

2. An air inlet arrangement according to claim 1 wherein said engine is a V-type engine comprising two rows of cylinders, said inlet and exhaust ducts being positioned between the two rows.

* * * * *